United States Patent [19]

Barrie

[11] 3,991,146

[45] Nov. 9, 1976

[54] METHOD OF ENCAPSULATING AN INSERT IN PLASTICS MATERIAL BY INJECTION MOLDING

[75] Inventor: Ian Torrance Barrie, Wheathampstead, England

[73] Assignee: Imperial Chemical Industries Limited, London, England

[22] Filed: Mar. 27, 1975

[21] Appl. No.: 562,688

[30] Foreign Application Priority Data
Apr. 1, 1974   United Kingdom............... 14282/74
Mar. 18, 1975  United Kingdom............... 11185/75

[52] U.S. Cl.............................. 264/46.7; 264/275; 264/278; 264/279; 264/328; 264/DIG. 83; 428/71; 428/313; 428/315; 428/461
[51] Int. Cl.²...................... B29D 27/00; B29E 1/10
[58] Field of Search................ 264/45.5, 46.7, 46.6, 264/271, 275, 277, 278, 279, 328, DIG. 83; 428/71, 313, 315, 461

[56] References Cited
UNITED STATES PATENTS

| 2,182,389 | 12/1939 | Reid................. | 264/328 X |
| 2,182,400 | 12/1939 | Husted............... | 264/328 X |
| 2,996,764 | 8/1961 | Ross et al........... | 264/271 X |
| 3,219,743 | 11/1965 | Berler............... | 264/275 |
| 3,238,287 | 3/1966 | Chapman.............. | 264/278 X |
| 3,311,690 | 3/1967 | Fischer.............. | 264/278 |
| 3,526,694 | 9/1970 | Lemelson............. | 264/279 X |
| 3,549,477 | 12/1970 | Burgman.............. | 264/275 X |
| 3,793,415 | 2/1974 | Smith................ | 264/55 X |
| 3,814,777 | 6/1974 | Schmidt.............. | 264/278 X |
| 3,825,637 | 7/1974 | Robin................ | 264/328 X |
| 3,873,656 | 3/1975 | Garner............... | 264/55 |
| 3,906,066 | 9/1975 | Barrie............... | 264/328 X |

FOREIGN PATENTS OR APPLICATIONS 1,156,556   7/1969   United Kingdom................ 264/328

OTHER PUBLICATIONS

Smith, Def. Pub. of Ser. No. 348,143, filed Apr. 5, 1973, on May 7, 1974, Def. Pub. No. T 922,007.

*Primary Examiner*—Philip Anderson
*Attorney, Agent, or Firm*—Cushman, Darby & Cushman

[57] ABSTRACT

Encapsulating an insert in plastics by injection moulding with one face of the insert bearing against the mould thus supporting the insert against movement during injection with subsequent relative movement between insert and the supporting mould face to allow the injected material to flow round that face of the insert.

10 Claims, 9 Drawing Figures

METHOD OF ENCAPSULATING AN INSERT IN PLASTICS MATERIAL BY INJECTION MOLDING

This invention relates to injection moulding of plastics materials.

For many applications, examples of which include furniture, car bumpers and window frames, it is desired to provide a moulded article having an insert substantially totally encapsulated in a plastics material. The insert, which may be of metal, provides strength and rigidity to the article while the plastics material may protect the insert from corrosion and may provide an attractive surface and/or a cushioning layer round the insert.

It has been proposed to make articles by positioning an insert in a mould, by means of supporting pins, and injecting an injection mouldable plastics material into the space between the inset and the cavity walls. It has been found in that process that, at the high pressures necessary to effect injection, the insert is liable to be displaced and/or become distorted during injection.

We have devised a process wherein such difficulties are reduced or eliminated.

Accordingly we provide a process for the production of an article having a rigid inset substantially encapsulated by a plastics material comprising, i. positioning the insert in a mould cavity, defined by the opposed faces of at least two mould members, with substantially the whole length of said insert supported against a cavity defining face of one of said mould members, ii. injecting injection mouldable plastics material in a fluid state into the mould cavity through at least one sprue channel positioned in a cavity defining face of a second of said mould members, said face of the second mould member being opposed to said face of said one mould member, whereby said mould cavity, except that part of the mould cavity volume enclosed by the insert positioned against said face of said one mould member, is filled with plastics material.

iii. while the plastics material is still in a fluid state, effecting relative movement between said insert and said face of said one mould member, whereby said insert is moved out of supporting engagement with said face of said one mould member, while maintaining said insert supported on intermittently spaced pins extending through, and relatively moveable to, said face of said one mould member, whereby the plastics material is caused to flow into the space between the insert and said face of said one mould member and hence to substantially encapsulate the insert, and iv. thereafter allowing the plastics material to solidify.

Herein the face of the mould member that supports the insert during injection of the plastics material is termed the supporting mould face.

In one embodiment of the invention, the relative movement between the insert and the supporting mould face increases the volume of the cavity occupiable by the plastics material from the volume of the mould cavity filled by the plastics material prior to effecting said relative movement. In such a process it is here neccessary that at least part of the plastics material injected into the cavity is a foamable plastics material containing a blowing agent and is injected at a temperature above the activation temperature of the blowing agent so that the foamable material can expand to fill the increased cavity volume.

Where the relative movement increases the volume of the cavity occupiable by the plastics material, not only foamable material need be injected. Thus a non-foamable material followed by foamable material may be injected. In this way, as described in our British Pat. No. 1,156,217, a non-foamed skin can be formed around the foamable material. If desired a further injection of non-foamable material may be made after injection of the foamable material so that the non-foamed skin substantially totally encloses the foamable material.

The amount of foamable material injected is preferably sufficient that the mould cavity filled by the plastics material, prior to effecting the relative movement between the insert and the supporting mould face, is filled without substantial foaming occurring.

One way of achieving an increase in the volume of the cavity occupiable by the plastics material is by effecting relative movement between the supporting mould face and face of the second mould member, i.e. that through which the plastics material is injected. Thus the relative movement between the insert and the supporting mould face can be effected by retracting said first mould member relative to the supporting pins and the second mould member.

The first mould member may be retracted simply by reducing the force, e.g. clamping pressure, exerted thereon to hold it in the "closed" position so that the foaming pressure of the foamable material causes it to retract.

Alternatively the first mould member may be positively moved to the retracted position.

Supporting pins are provided relative to which the supporting mould face is moveable. These pins, located at spaced intervals, support the insert when the relative movement between the insert and the supporting mould face takes place. When the supporting mould face is supporting the insert, i.e. during the injection of the plastics material, the ends of these pins preferably lie flush with the supporting mould face. However if the insert is recessed so that only the edges thereof are supported by the supporting mould face, the pins may extend beyond the supporting mould face and bear against the recessed portion of the insert.

In another embodiment of the invention, after injection of the plastics material, the supporting pins may be moved towards the face of the second mould member, i.e. towards the mould face through which the plastics material was injected, with said pins in engagement with sid insert thus moving the insert away from the supporting mould face. In this way a wider flow path between the insert and the face of the second mould member can be utilized during injection of the plastics material, or materials, than is commensurate with the thickness of the encapsulating plastics material in the finished article.

In this modification of the invention, the supporting mould face need not be retractable relative to the face of the second mould member and a foamable plastics material need not be utilised.

However it will be appreciated that a combination of the two techniques may be utilised. Thus the supporting pins may move the insert towards the opposed mould face prior to, or at the same time as, retration of the supporting mould face takes place. Such movement of the insert may assist the foamable plastics material to flow between the insert and the supporting mould face.

If desired, the supporting pins may be retracted, preferably until they lie flush with the supporting mould face, after the plastics material has at least partially flowed into the space between the insert and the supporting mould face, so that the plastics material can flow into the spaces vacated by said pins. Here it is necessary that the retraction of the pins is delayed until the plastics material has flowed into the space between the insert and the supporting mould face and solidified to such an extent that it supports the insert during the subsequent solification of the plastics material. However the retraction of the pins takes place before the plastics material has solidified to such an extent that it will no longer flow. towards defining flowable, Where the relative movement between the insert and the supporting mould face is brought about by moving the insert towards the face of the second mould member, i.e. that through which the plastics material was injected, for example by moving the supporting pins in engagement with the insert towards the face of the second mould member, the supporting pins may be retracted after plastics material has flowed to between the insert and the supporting mould face, and, in order to compensate for the cavity volume increase by retraction of the pins, the overall cavity volume may be decreased by moving at least one mould member towards another mould member defining the mould cavity, thereby causing the partially solidified, but flowable, plastics material to flow into the spaced vacated by the pins.

Where the injected plastics material includes a foamable material, reduction in cavity volume by movement of one or more of the mould members is not necessary as foaming of the foamable plastics material causes the partially solidifed, but flowable, plastics material to flow into the spaces vacated by the pins.

In some cases it will not be necessary or desired to completely encapsulate the insert i.e. at the positions of the supporting pins as it may be desired to utilise those positions as fastening positions whereby the insert is fastened to another member in an assembled structure. In such a case the supporting pins may be integrally formed with, or fastened to, the insert and are located, during the moulding operation, in recesses in the mould member bearing the supporting mould face. Alternatively the holes produced upon removal of the moulded article from the mould cavity and supporting pins may be utilised for access to the insert to fasten the insert to another member in an assembled structure.

The position of the sprue channel or channels through which the plastics material is injected into the mould cavity is located in the face of the second mould member opposed to the supporting mould face so that the pressure of the plastics material as it is injected and fills the mould cavity holds the insert firmly against the supporting mould face. So far as is possible, a symmetrical flow path around the insert is preferred to reduce the possiblity of lateral displacement or distortion of the insert relative to the supporting mould face.

It will be appreciated that a weld line will tend to be formed in the final article in that part of the article formed between the supporting mould face and the insert. However such a weld line can generally be tolerated or minimised by suitable mould design.

The insert is preferably made from metal e.g. steel although other materials such as wood or plastics materials can be used provided they are sufficiently form stable at the temperatures and pressures encountered during the injection moulding process. The insert may if desired be hollow e.g. a metal tube but again should have sufficient strength to resist deformation at the injection pressures utilised.

A wide variety of plastics materials may be as the injection mouldable material.

Thus any plastics material that can be injection moulded can be used. Such materials are synthetic resin compositions which may be injected into a mould cavity while in the state of a viscous liquid and which can thereafter be caused to solidify in the mould cavity. Thus compositions containing synthetic thermoplastic polymers that solidify on cooling may be used which can be injected in the form of viscous melts and allowed to solidify in the mould cavity by cooling. Alternatively compositions containing synthetic thermosetting polymers may be used which can be injected into the mould cavity in the state of a viscous liquid and then caused to solidify be effecting cross-linking while in the cavity. Generally thermo-setting compositions are cross-linked by heating.

Where a foamable material is used, the plastics material contains a blowing agent and is injected at a temperature above the activation temperature of the blowing agent. In the case of a heat decomposable blowing agent, the foamable material is injected at a temperature above the decomposition temperature whereas if the blowing agent is a gas or a liquid, the foamable material is injected at such a temperature that it will foam in the mould when the pressure thereon is reduced e.g. by effecting an increase in the volume of the mould cavity. Examples of suitable blowing agents are set out in our U.S. Pats. 3,751,534 and 3,793,415.

Where a sequential injection process e.g. non-foamable material followed by foamable material, is utilised, the synthetic resin of the two materials may be the same or different.

Examples of suitable injection mouldable thermoplastics materials are set out in our U.S. Pat. No. 3,793,415.

It will be appreciated that the use to which the article is to be put will determine what plastics material, or combination of materials, should be used. Thus where it is desired to make for example a padded or cushioned furniture arm-rest a flexible polyurethane foam or polyvinyl chloride foam, may be used, possibly with a non-foamed skin or similar material. For car bumpers, polyurethane foams are particularly suitable and the insert with the incapsulating foam may, if desired, be subsequently enclosed in a shaped envelope formed from polyurethane film. For window frames a hollow rectangular or a T-shaped metal beam encapsulated in polyvinyl chloride or polypropylene could be used.

The invention is further illustrated by reference to the accompanying drawings wherein FIG. 1 is a cross section through a mould after injection of the plastics materials.

Figure 1:
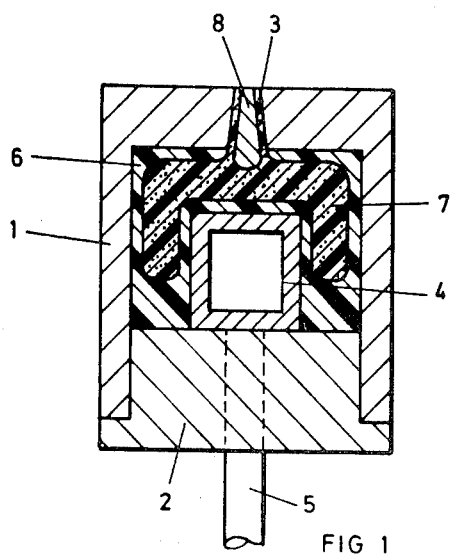
Figure 2:
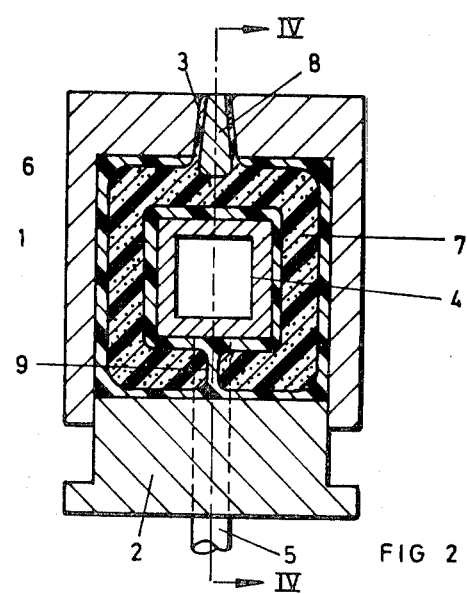
FIG. 2 is a view similar to FIG. 1 but after retraction of the mould member having the supporting mould face.

Referring first to the embodiment illustrated by FIGS. 1 to 5, a mould cavity is defined by a fixed mould member 1 and a moveable mould member 2 slideably mounted therein. The cavity defines the shape of a car bumper. The mould member 1 is provided with a sprue channel 3 through which plastics materials can be injected. In FIG. 1 an insert 4, in the foam of a hollow box sectioned steel member having closed ends, is shown seated upon the surface of mould member 2. This surface thus constitutes the supporting mould face. Supporting pins 5 slideably mounted with respect to mould member 2 are also provided and in FIG. 1 are shown with their ends flush with the supporting mould face. The lower surface of insert 4 is thus supported along its whole length by the surface of mould member 1 and the pins 5.

Non-foamable plastics material 6, followed by foamable plastics material 7 containing a blowing agent, and then a further small quantity 8 of non-foamable plastics material are injected into the mould cavity in a fluid state through sprue channel 3. Since the injection is through the mould face opposed to the supporting mould face, the injection pressure thus holds insert 4 firmly against the supporting mould face and so the insert 4 is supported during injection against displacement or distortion. Further by arranging that the cavity is symmetrical, any tendency to lateral displacement can be avoided.

Figure 3:
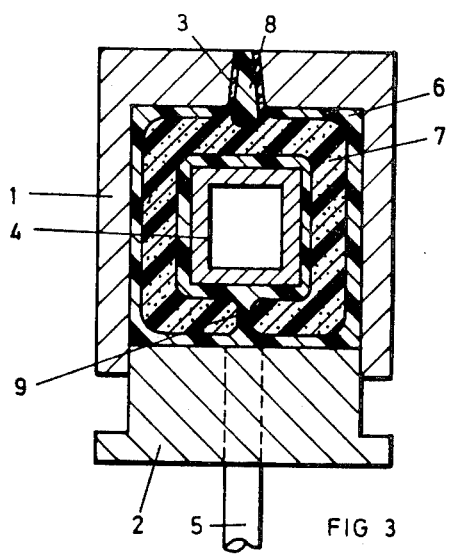
FIG. 3 is a view similar to FIGS. 1 and 2 but after retraction of the supporting pins.
Figure 4:
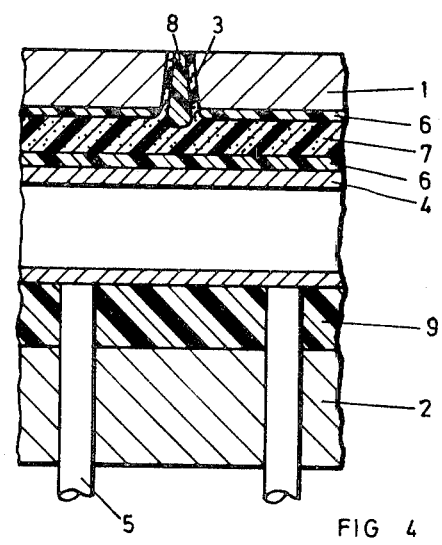
FIG. 4 is a section along the line IV—IV of FIG. 2.

The quantity of plastics materials injected is such that the mould cavity is filled with substantially no foaming of the foamable material occurring. The system is then as depicted in FIG. 1. The clamping force on mould member 2 is then reduced, before the plastics materials have solidified, thereby reducing the pressure on the foamable material thus causing the latter to faom and force mould member 2 away from the opposed mould face through which the plastics materials were injected. The insert however remains supported by pins 5 and so does not move relative to mould member 1. The expanding foamable plastics material thus causes the enveloping skin of non-foamable material to flow into the space between insert 4 and the supporting mould face. After sufficient plastics material has flowed into this space (as in FIGS. 2 and 4) and has solidified sufficiently to support insert 4, the pins 5 are retracted, as shown in FIG. 3. The expanding foamable material forces the plastics material to flow to fill the spaces vacated by these pins. It is seen from FIGS. 2, 3 and 4 that a web 9 of non-foamable material is produced between the insert 4 and the supporting mould face where the plastics materials flowing into the space between insert 4 and the supporting mould face from either side of insert 4 meet. This web will give rise to a weld line on the surface of the moulding.

Figure 5:
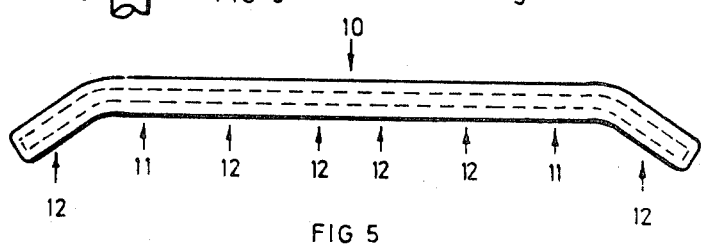
FIG. 5 is a plan view of a moulded car bumper made by the technique of FIGS. 1 to 4.

Referring to the bumper shown in FIG. 5, the injection point, i.e. the sprue, is indicated by arrow 10. Typical supporting pin positions are indicated by arrows 11 and 12. In order that access to the insert may be had to enable the bumper to be fastened to the car body, the supporting pins at, for example, positions 11 need not be retracted during the final part of the moulding operation. Alternatively pins at such positions may be formed integrally with the insert or be bolted thereto prior to insertion of the insert in the mould cavity. These pins fastened to the insert are then used as supporting pins during the moulding operation.

It will be noted that apart from the sprue position, the blemishes on the moulding resulting from the moulding technique, e.g. the weld line and any blemishes at the supporting pin positions, appear on the side of the moulding which will not be generally visible in use. The blemish resulting from the injection point can be disguised in a subsequent painting or plating operation or by means of an insignia, e.g. a nameplate or badge.

Figure 6:
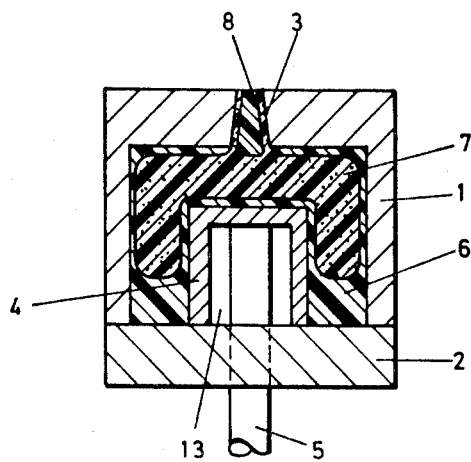
FIG. 6 is a view similar to FIG. 1 showing an alternative embodiment using a horizontal flash mould and a moveable insert.
Figure 7:
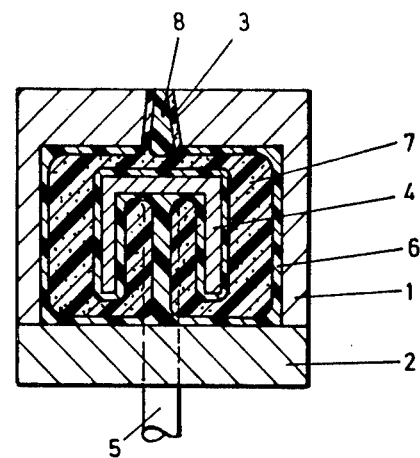
FIG. 7 is a view similar to FIG. 6 but after movement of the insert.

In the embodiments shown in FIGS. 6 and 7, the mould member 2 is not relatively moveable with respect to mould member 1 (except to open the mould to remove the moulding therefrom). The mould is thus of the horizontal flash type. Here the insert 4 is a U-sectioned channel and the ends of the limbs of the 'U' are seated on the supporting mould face to enclose a space 13 inside the channel sectioned insert 4. The supporting pins 5 here extend through the mould member 2 and support the base of the 'U'. After injection of the plastics materials as previously described so that the cavity is filled, (except that part of the mould cavity volume enclosed by the insert positioned against the supporting mould face, i.e. the volume of the insert plus the volume of space 13) preferably without substantial foaming of the foamable material 7, the pins 5 are urged further through mould member 2 thus lifting the insert 4 off the supporting mould face. Thus upon movement of the insert, the volume of the cavity occupiable by the plastics material is increased. The plastics materials can then flow, by virtue of the pressure of the foaming agent, into the space 13 and the foamable material can thus foam.

The system is then as depicted in FIG. 7. As in the previous embodiment, the pins 5 may be retracted if desired when the plastics materials have solidified sufficiently to support the insert. However, again the pins are preferably retracted while the plastics materials are still able to flow to fill the spaces vacated by the pins.

Figure 8:
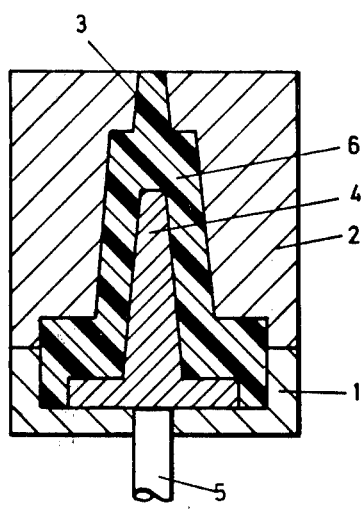
FIGS. 8 and 9 are views similar to FIG. 6 and 7 respectively showing another embodiment wherein a non-foamable plastics material is used.
Figure 9:
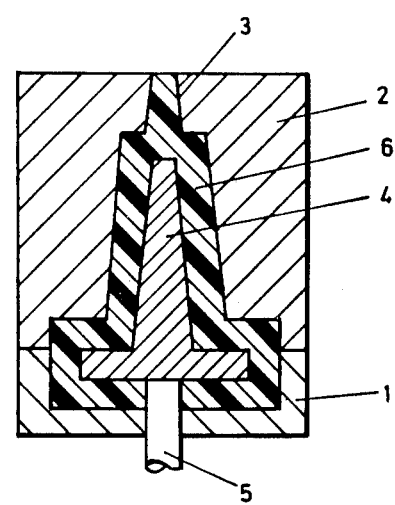

In the embodiment shown in FIGS. 8 and 9 a similar technique is adopted but no additional volume is created on movement of the insert. Here only non-foamable material 6 is injected and the insert 4 in this instance is a T-shaped bar.

It will be appreciated that in fact in this case the volume of the cavity is effectively reduced upon movement of the insert by virtue of the intrusion of the pins 5 into the cavity volume. This decrease in volume may be used to apply a packing pressure to the plastics material to compensate for shrinkage occurring during subsequent cooling. Generally in such a case it will not be possible to subsequently retract the supporting pins 5.

It will further be appreciated that it is not necessary to use a sequential injection technique in the embodiments depicted in FIGS. 1 to 7. Thus, in those embodiments, all the plastics material injected could be foamable. Further in the embodiment of FIGS. 8 and 9, a foamable material, or non-foamable material followed by a foamable material, may be used instead of only non-foamable material. In this case the amount of plastics material injected should be such that the desired amount of foaming can take place prior to movement of the insert. In this case, it will be appreciated, the supporting pins 5 may be retracted after movement of the insert as in the embodiment of FIGS. 1 to 7.

I claim:

1. A process for the production of an article having a rigid insert substantially encapsulated by a plastics material comprising,
   i. positioning the rigid insert in a mould cavity, defined by the opposed faces of at least two mould members, with substantially the whole length of said insert supported against a cavity defining face of one of said mould members.
   ii. injecting a quantity of injection mouldable plastics material in a fluid state into the mould cavity through at least one sprue channel positioned in a cavity defining face of a second of said mould members, said face of the second mould member being opposed to said face of said one mould member, whereby said mould cavity, except that part of the mould cavity volume enclosed by the insert positioned against said face of said one mould member, is filled with plastics material,
   iii. after completion of injection but while the plastics material is still in a fluid state, effecting relative movement between said insert and said face of said one mould member, whereby said insert is moved out of supporting engagement with said face of said one mould member, while maintaining said insert supported on intermittently spaced pins extending through, and relatively moveable to, said face of said one mould member, whereby the plastics material is caused to flow into the space between the insert and said face of said one mould member and hence to substantially encapsulate the insert, and
   iv. thereafter allowing the plastics material to solidify.

2. A process according to claim 1 comprising effecting said relative movement between said insert and said face of said one mould member by moving said pins relative to said face of said one mould member towards said face of said second mould member with said pins in engagement with said insert.

3. A process according to claim 1 wherein the relative movement between the insert and the face of said one mould member increases the volume of the cavity occupiable by the plastics material from the volume of the mould cavity filled by the plastics material prior to effecting said relative movement, and said quantity of plastics material comprises at least one quantity of a foamable plastics material containing a blowing agent injected at a temperature above the activation temperature of the blowing agent, so that, upon effecting said relative movement between said insert and the face of said one mould member, foaming of the foamable mterial causes the plastics material to expand to occupy said increased cavity volume.

4. A process according to claim 3 comprising effecting said relative movement between said insert and the face of said one mould member by retracting said one mould member relative to said pins and relative to said second mould member.

5. A process according to claim 3 in which the injection of the plastics material comprises injection of a non-foamable plastics material followed by injection of a foamable plastics material.

6. A process according to claim 5 in which the injection of the plastics material comprises injection on a non-foamable plastics material followed by injection of a foamable plastics material followed by injection of a further quantity of non-foamable plastics material.

7. A process according to claim 3 in which the amount of foamable material injected is such that the mould cavity filled by the plastics material, prior to effective the relative movement between the insert and the face of said one mould member, is filled without substantial foaming occuring.

8. A process according to claim 3 in which the insert is recessed so that only the edges thereof are supported by the face of said one mould member, and said pins extend beyond the face of said one mould member and bear against the recessed portion of said insert.

9. A process as claimed in claim 3 comprising retracting the pins after the plastics material has at least partially flowed into the space between the insert and the face of said one mould member and has solidified to such an extent that it supports the insert during the subsequent solidification of the plastics material, but before the plastics material has solidified to such an extent that it will no longer flow, so that foaming of the foamable plastics material causes said partially solidified, but flowable, plastics material to flow into the spaces vacated by said pins.

10. A process according to claim 1 comprising retracting said pins after the plastics material has at least partially flowed into the space between the insert and the face of said one mould member and has solidified to such an extend that it supports the insert during the subsequent solidification of the plastics material, but before the plastics material has solidified to such an extent that it will no longer flow, and moving at least one mould member towards another mould member so as to reduce the volume of the mould cavity to compensate for the increasee in cavity volume caused by retraction of said pins, thereby causing said partially solidified, but flowable, plastics material to flow into the spaces vacated by said pins.

* * * * *